Figure 1:
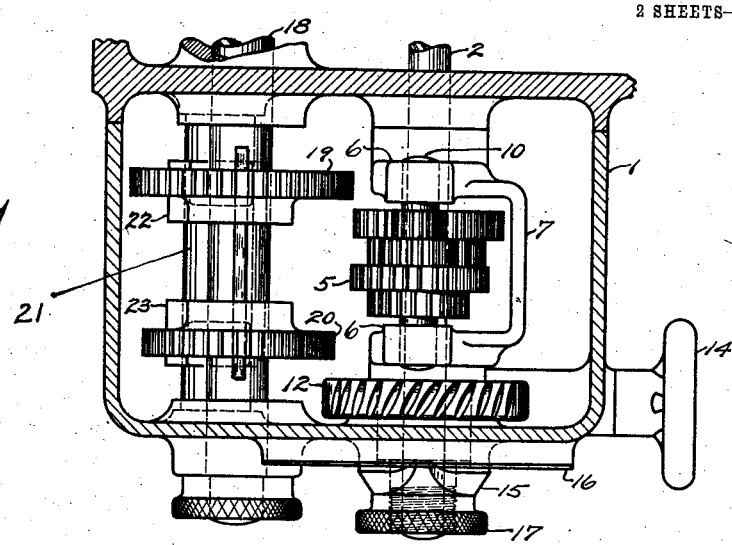

W. F. ZIMMERMANN.
VARIABLE SPEED MECHANISM.
APPLICATION FILED SEPT. 29, 1910.

1,021,439.

Patented Mar. 26, 1912.

2 SHEETS—SHEET 1.

WITNESSES.
B. E. Barnes.
W. L. Hoagland

INVENTOR
William F. Zimmermann

W. F. ZIMMERMANN.
VARIABLE SPEED MECHANISM.
APPLICATION FILED SEPT. 29, 1910.
1,021,439.
Patented Mar. 26, 1912.
2 SHEETS—SHEET 2.
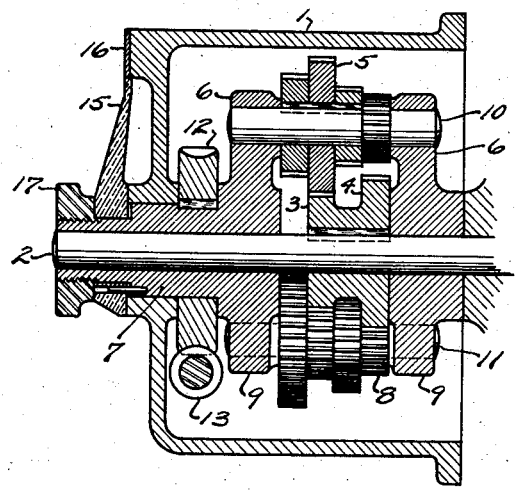
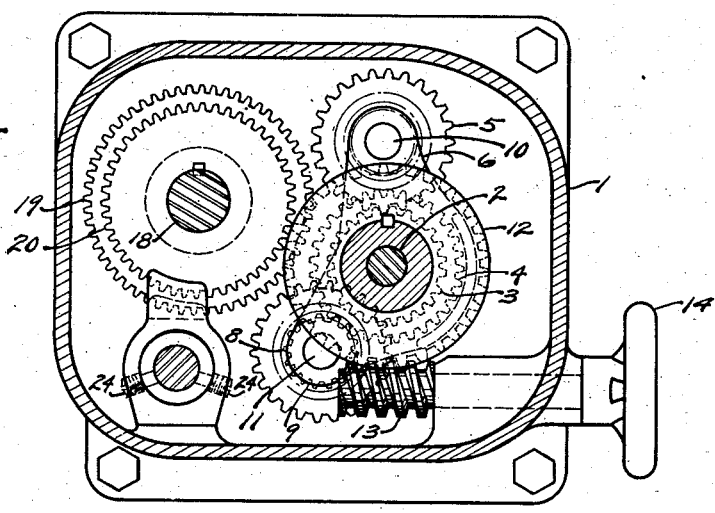
WITNESSES.
B. E. Barnes.
W. L. Hoagland.
INVENTOR.
William F. Zimmermann.

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

VARIABLE-SPEED MECHANISM.

1,021,439.     Specification of Letters Patent.     Patented Mar. 26, 1912.

Original application filed July 31, 1909, Serial No. 510,657. Divided and this application filed September 29, 1910. Serial No. 584,436.

*To all whom it may concern:*

Be it known that I, WILLIAM F. ZIMMERMANN, a citizen of the United States, and a resident of the city of Newark, in the county of Essex and State of New Jersey, have invented certain new and useful Improvements in Variable-Speed Mechanism, and do hereby declare the following specification, taken in connection with the drawings forming a part of the same, to be a full, clear, and exact description of the principle of said invention and the best mode in which I have contemplated applying that principle, so as to distinguish it from other inventions.

The invention relates primarily to means for varying the speed of any machine in which a variety of speeds are required and more particularly to means for varying the speed or feed of machine tools.

The object of this invention, which is a division of the application filed July 31, 1909, Serial Number 510,657 for metal working machines, is to provide a simple, rigid and compact means to transmit a series of variable speeds in geometric ratio from a constantly rotating shaft.

Another feature of the invention relates to the means for intermeshing the various trains of gears, the manipulation whereof is simple, and which is so arranged as to prevent the operator from connecting two or more trains of gears with the driven shaft, thereby attempting to rotate said driven shaft at two different speeds at the same instant of time, which would result in serious damage.

The invention comprises a constantly rotating drive shaft, two series of diversely sized gears arranged to pivot about said drive shaft, each one of said series rotatably connected to said drive shaft and constituting a tumbler gear arrangement, a driven shaft, a series of driven gears of diverse sizes slidably mounted on said driven shaft and rotatable therewith, means in common to slide each of said driven gears relatively to the other and means to rock said tumbler, whereby each one of said tumbler gears may be individually engaged with each one of said driven gears, and means to lock said tumbler gears in any adjusted position.

The annexed drawings and the following description set forth in detail, certain mechanism embodying means constituting however, but one of the various mechanical forms in which the principle of the invention may be used.

The novelty of the invention will be readily understood from the drawings, which illustrate the invention in its preferred form, and from the following description thereof.

The novelty of the invention will be more particularly pointed out in the claims annexed to the said description.

Figure 2:
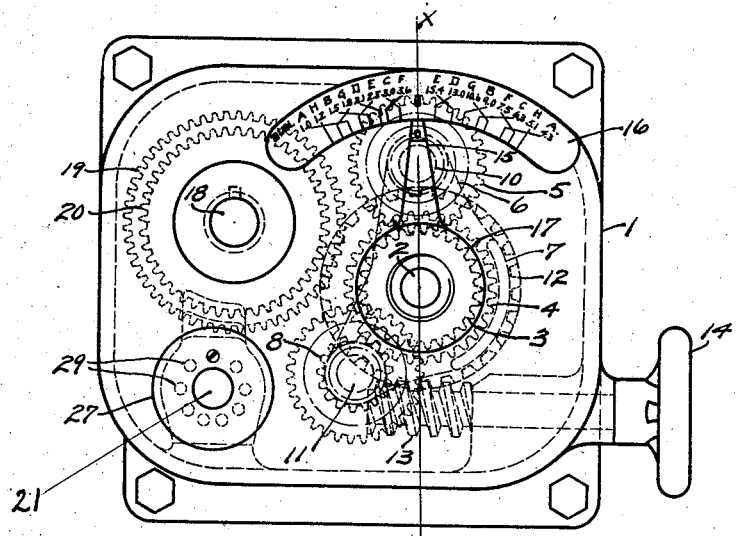
Figure 3:
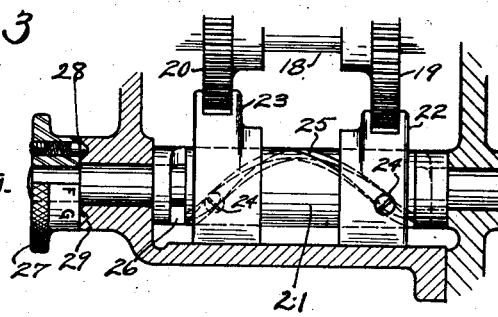

Referring to the drawings: Figure 1 is a plan view of the invention in the preferred form with the casing or frame in section to better illustrate the interior mechanism. Fig. 2 is a front elevation thereof. Fig. 3 is a partial sectional view, illustrating the shifting device for the driven gears. Fig. 4 is an end sectional view at X of Fig. 2, clearly illustrating the tumbler arrangement; and Fig. 5 is a front elevation similar to that shown in Fig. 2, but with the casing or frame in section to illustrate the interior mechanism.

Referring particularly to Figs. 1 and 4, the frame 1 incloses practically the entire mechanism. The constantly rotating drive shaft 2 is rotatably mounted within said frame 1, and has a double gear 3 and 4, secured thereto and rotatable therewith. The said gear 3 meshes with and rotates the gear 5, which is one of a series of diversely sized gears rotatably mounted in the arm 6 of the tumbler bearing 7, and the said gear 4 engages with and rotates the gear 8 of a second series of diversely sized gears rotatably mounted in the arm 9 of said tumbler bearing 7. The said two series of tumbler gears are arranged practically on opposite sides of said drive shaft 2 and are keyed to their respective shafts 10 and 11 which rotate in bearings of the tumbler bearing 7.

The double armed tumbler bearing 7 is pivotally mounted upon said drive shaft 2, with a bearing within the frame 1, so that any strain imparted to said tumbler bearing 7, is taken up by the frame and not by the drive shaft 2. In the drawings the tumbler bearing 7 is provided with a bearing in the frame on the one side only. However, both sides may be supported when it is desired to transmit great power. The rotating or rocking of the tumbler bearing 7, and therewith the two series of tumbler gears, is accomplished manually by means of a worm wheel 12 secured thereto which is engaged by a worm 13 to which a hand wheel 14 is secured. The end of the tumbler bearing 7 arranged to rock in the frame 1, is provided with an indicator or pointer 15 secured thereto and pointing to the index plate 16, to indicate the proper position of said tumbler for any speed required. A nut 17 is also provided on the end of said tumbler to clamp same securely to the frame, thereby assisting the worm 13 and wheel 12 to hold said tumbler in any adjusted position. A driven shaft 18, rotatably mounted in said frame 1, is provided with two gears 19 and 20, slidably keyed thereto and rotatable therewith; both of these gears are arranged to be individually engaged with each one of the gears comprising the two series of tumbler gears.

The adjusting of the driven gears 19 and 20, to engage each individually with each one of the two series of tumbler gears, is accomplished by means of a novel device comprising an adjusting shaft 21, upon which two shifting shoes or forks 22 and 23 are mounted, each of which is provided with a pin 24 therein to engage a cam groove 25 in said adjusting shaft 21. Said shifting shoes 22 and 23 are fitted to slide on the frame to prevent their turning. The cam groove 25 is helically formed in said adjusting shaft 21, with a concentric groove 26 at each terminal thereof, so that either one of the driven gears 19 and 20 may be and in fact must be moved entirely clear of any of the tumbler gears before the other gear can be brought to engage with one of the tumbler gears.

The adjusting shaft 21 is rotated in either direction by a knurled hand wheel 27, upon which letters have been stamped to indicate the position of the driven gears 19 and 20. A spring pressed plunger 28 is also provided in said hand wheel 27 to engage a series of notches 29, in the frame hub. Each notch corresponding to some position of the driven gears as indicated by the letters on said hand wheel. This plunger by its action enables the proper position to be felt.

In the drawings the driven gears are shown in a position clear of the tumbler gears. Now, if the adjusting shaft 21 were turned with the top coming as viewed in Fig. 3, the driven gear 19 would be moved so that the shoe 22 would be in engagement with the concentric groove 26 at the terminal of the helical groove 25, and further movement of said gear 19 would be thereby discontinued. Simultaneously with the above recited movement of said driven gear 19, the other driving gear 20 would be moved into a position to be engaged with the first gear of either series of tumbler gears. Further rotation of said adjusting shaft in the same direction would move said driven gear 20 into each successive engaging position until it arrived adjacent to said driven gear 19, when further movement in that direction would be arrested. By a reverse movement of the adjusting shaft 21, the gear 20 is returned until it arrives at its concentric groove at the other terminal and then the other driven gear 19 would be moved into the successive positions of engagement with any one of either series of tumbler gears.

The shifting arrangement just described prevents the possibility of either of said driven gears 19 and 20 interfering with the proper engagement of the other gear with one gear of either series of tumbler gears, and also prevents the possibility of both driven gears meshing with the same tumbler series at one and the same time, thereby attempting to rotate the driven shaft at two different speeds at the same instant of time, which would result in a breakage somewhere in the train. The above recited feature is very important and the omission of such a device or one similar to it in any variable speed mechanism would make it a very precarious one.

In the arrangement as shown and described the operation of changing from any one speed of the driven shaft to any other is as follows: The nut 17 is loosened and the tumbler gears brought into the position shown in the drawings. The required speed having been ascertained, the direct reading index 16 is consulted (the one shown is for feeds) to obtain the proper letter to move the driven gears into the correct position as herein before described, and it is then only necessary to rock the tumbler gears until the indicator points to the speed desired.

From the device as shown, 16 different speeds or feeds in a geometric progression are obtained. This number, however, may be materially increased by adding more gears to either or both of the tumbler series, or by increasing the number of driven gears and providing proper terminals without departing from the spirit of this invention.

Having described my invention I claim as new and desire to secure by Letters Patent:

1. The combination with a frame, of a driven shaft rotatably mounted therein, a series of driven gears individually slidable on and rotatable with said shaft, a tumbler pivotally mounted in said frame, a gear carried by said tumbler, a drive shaft, a gear mounted on and rotatable with said drive and intermeshing with said tumbler gear, means to individually slide said driven gears, and means to rock said tumbler whereby said tumbler gear is intermeshed with any one of said driven gears.

2. The combination with a driven shaft, of a series of driven gears individually slidable on and rotatable therewith, a drive shaft, a gear mounted on and rotatable with said drive shaft, a tumbler pivoted about said drive shaft, a tumbler gear carried by said tumbler and intermeshing with said drive shaft gear, means to individually slide said driven gears and means to rock said tumbler whereby said tumbler gear is intermeshed with any one of said driven gears.

3. The combination with a frame, of a drive shaft, a gear mounted on and rotatable with said shaft, a tumbler pivotally mounted in said frame, a tumbler gear carried by said tumbler and intermeshing with said drive shaft gear, a driven shaft rotatably mounted in said frame, a series of driven gears individually and relatively slidable on said driven shaft and rotatable therewith, means to individually and relatively slide each gear of said series and means to rock said tumbler, whereby said tumbler gear is intermeshed with one of said driven gears when slid into the engaging position.

4. The combination with a driven shaft of a series of driven gears individually and relatively slidable thereon and rotatable therewith, a drive shaft, a gear mounted on and rotatable with said shaft, a tumbler pivoted about said shaft, a tumbler gear carried by said tumbler and intermeshing with said drive shaft gear, means in common to individually and relatively slide each gear of said series of driven gears, and means to rock said tumbler to intermesh said tumbler gear with one of said driven gears when moved into the engaging position.

5. The combination with a frame of a driven shaft rotatably mounted therein, a series of driven gears individually and relatively slidable on and rotatable with said driven shaft, a tumbler pivotally mounted in said frame, a drive shaft, a gear mounted on and rotatable with said shaft, a tumbler gear carried by said tumbler and intermeshing with said drive shaft gear, means to individually and relatively slide said driven gears and means to rock said tumbler, whereby said tumbler gear is intermeshed with any one of said series of driven gears and means to clamp said tumbler to said frame in the position of intermesh.

6. The combination with a driven shaft, of a series of driven gears individually and relatively slidable on said shaft and rotatable therewith, a drive shaft, a double armed tumbler pivoted about said drive shaft, a tumbler gear mounted in each arm of said tumbler, gears on said drive shaft intermeshing with said tumbler gears, means to slide each of said driven gears individually and relatively and means to rock said tumbler, whereby either one of said tumbler gears intermeshes with one of said driven gears when moved into engaging position.

7. The combination with a frame, of a driven shaft rotatably mounted therein, a series of driven gears individually and relatively slidable on said shaft and rotatable therewith, a drive shaft, a double armed tumbler pivotally mounted in said frame, a series of tumbler gears rotatably mounted in each arm of said tumbler gearing connecting said tumbler gears to said drive shaft, means to individually and relatively slide each of said driven gears, and means to rock said tumbler, whereby any one of said series of tumbler gears intermeshes with any one of said driven gears when moved into the engaging position.

8. The combination with a frame, of a driven shaft, two gears individually and relatively slidable thereon and rotatable therewith, a drive shaft, two gears secured thereto, a double armed tumbler pivotally mounted in said frame and about said drive shaft, a series of diversely sized gears rotatably mounted in each arm of said tumbler and arranged to individually engage each one of said driven gears.

9. The combination with a frame, of a driven shaft, two gears individually and relatively slidable thereon and rotatable therewith, a drive shaft, two gears secured thereto, a double armed tumbler pivotally mounted in said frame, a series of diversely sized gears rotatably mounted in each arm of said tumbler, each one of said tumbler series driven individually by one of said drive shaft gears and arranged to individually engage each one of said driven gears.

10. The combination with a frame, of a driven shaft, two gears slidably mounted thereon and rotatable therewith, means to individually slide each one of said gears so that at no time can both gears be engaged with the driving means, a drive shaft, two gears secured thereto, a double armed tumbler pivotally mounted in said casing, a series of diversely sized gears rotatably mounted in each arm of said tumbler and engaging with said drive shaft gears and means to individually intermesh each one of said tumbler gears with each one of said driven gears.

11. The combination with a frame, of a driven shaft, two gears slidably mounted thereon and rotatable therewith, a drive shaft, a tumbler pivotally mounted in said frame, a tumbler gear rotatably mounted in said tumbler and connected to said drive shaft, means to individually slide each one of said driven gears into an intermeshing position and to maintain the other in a non-intermeshing position and means to rock said tumbler to engage said tumbler gear with one of said driven gears when in the intermeshing position.

12. The combination with a frame, of a driven shaft, a series of diversely sized gears slidably mounted thereon and rotatable therewith, a drive shaft, a tumbler pivotally mounted in said frame, a tumbler gear rotatably mounted in said tumbler and connected to said drive shaft, means in common comprising a cam shaft to individually slide each one of said driven gears into an intermeshing position and to maintain the others in a non-intermeshing position and means to rock said tumbler to intermesh said tumbler gear with one of said driven gears when in the position of intermesh.

WILLIAM F. ZIMMERMANN.

Witnesses:
HUGO W. JACOBSON,
B. E. BARNES.

Copies of this patent may be obtained for five cents each, by addressing the "Commissioner of Patents, Washington, D. C."